United States Patent [19]

Higgins et al.

[11] Patent Number: 5,695,169

[45] Date of Patent: Dec. 9, 1997

[54] STOP VALVE WITH STURDY HANDLE CONNECTION

[75] Inventors: Bruce Wayne Higgins, South Lyon; Walter John Budzinski, Sterling Heights; Donald Scott Glover, Birmingham, all of Mich.

[73] Assignee: Brass-Craft Manufacturing Company, Novi, Mich.

[21] Appl. No.: 671,981

[22] Filed: Jun. 28, 1996

[51] Int. Cl.$^6$ .................................................... F16K 5/00
[52] U.S. Cl. .............................. 251/304; 251/310; 16/121
[58] Field of Search ................................. 251/304, 309, 251/310, 904; 16/121

[56] References Cited

U.S. PATENT DOCUMENTS

| | | |
|---|---|---|
| 4,257,575 | 3/1981 | Runyan ................................. 251/309 X |
| 4,562,994 | 1/1986 | MacDonald . |
| 4,609,177 | 9/1986 | Turner et al. . |
| 4,958,802 | 9/1990 | Underwood ........................... 251/904 X |
| 5,076,540 | 12/1991 | Murphy . |
| 5,154,396 | 10/1992 | Conley ................................... 251/309 |

*Primary Examiner*—John Fox
*Attorney, Agent, or Firm*—Reising, Ethington, Barnard & Perry

[57] ABSTRACT

A three-piece angle stop valve comprises a valve body (10), a resilient control sleeve (12) and a handle (14), with no separate fastening or sealing element required. The control sleeve has a stem (28) that has annular outer splines (32) and inner grooves (36) and splines (37) surrounding axially center cavity (38). The handle has a central post (40) that intrudes into cavity and has complementary splines (42) that interengage with grooves (36) and splines (37) of stem section. The handle also has an annular mid section (44) with complementary inner splines (46) that interengage with splines (32) on the outer wall of stem section (28) to provide significant increased torque transfer capability to turn the control sleeve within the valve body.

6 Claims, 1 Drawing Sheet

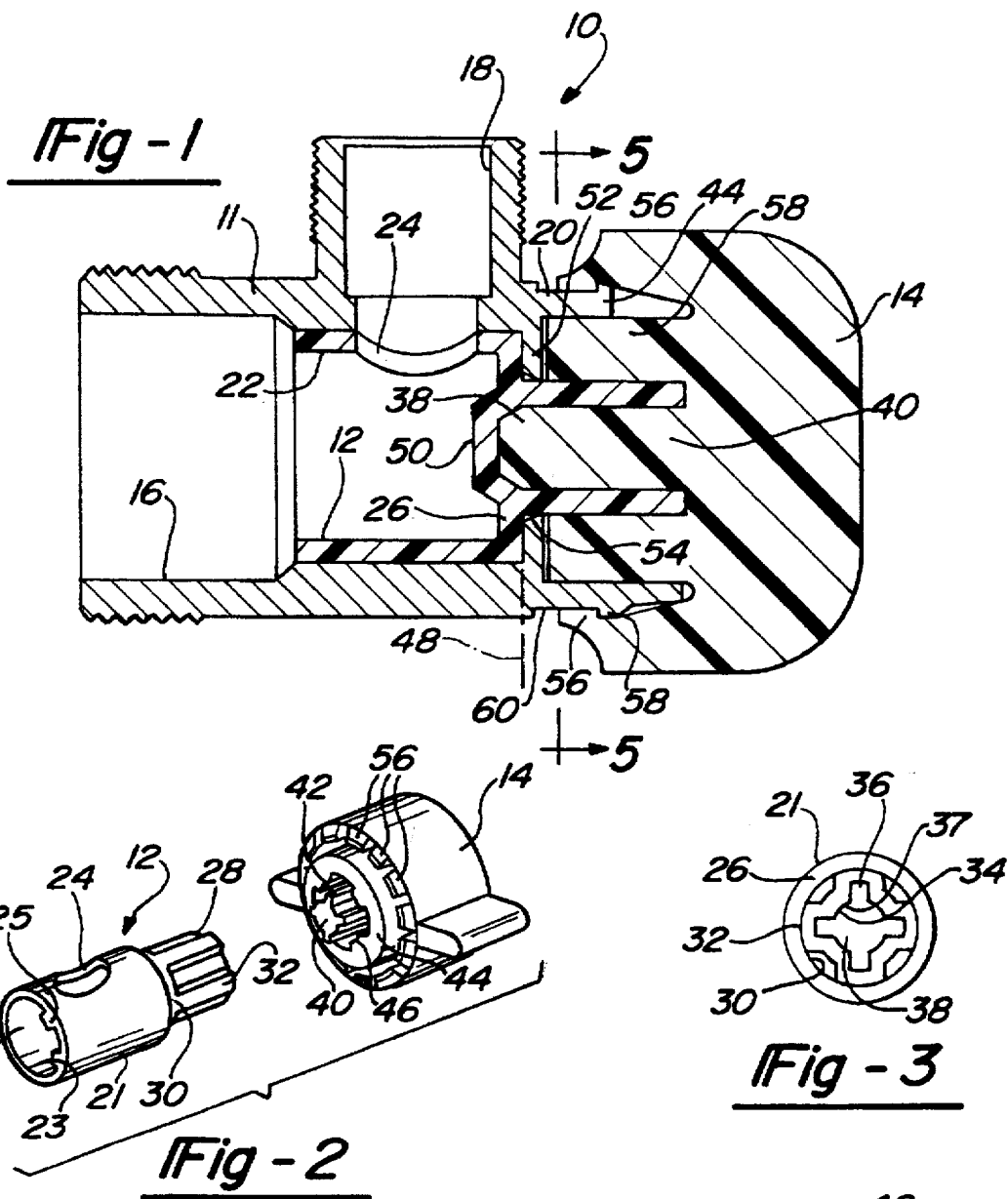
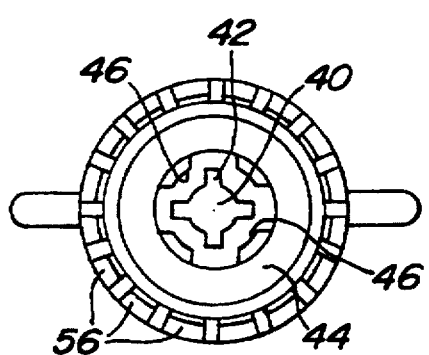
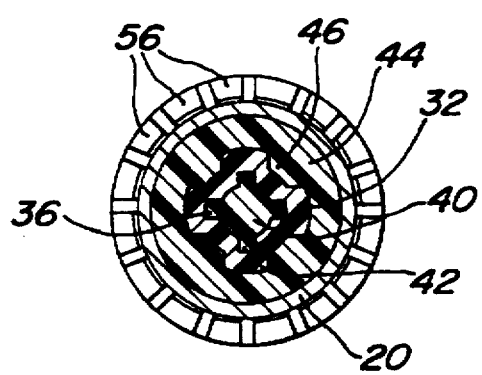

STOP VALVE WITH STURDY HANDLE CONNECTION

TECHNICAL FIELD

The field of this invention relates to stop valves commonly used in water supply lines leading to sinks, bathtubs, showers, toilets and the like.

BACKGROUND OF THE DISCLOSURE

A stop valve is a shut-off valve to permit the replacement of washers or other repairs to be accomplished on a fixture valve without shutting down an entire plumbing system. The stop valve is commonly located in the fixture supply line between a wall and the fixture. Stop valves are generally available in two basic styles. One style is known as an angle stop valve that has the inlet and outlet of the valve at right angles to each other. The other standard configuration is a straight-through arrangement wherein the inlet and outlet are coaxially aligned with each other.

One type of effective simple and efficient angle stop valve is disclosed in U.S. Pat. Nos. 4,562,994 and 4,609,177 to Turner et al and incorporated herein by reference. Another example of an angle stop valve is disclosed in U.S. Pat. No. 5,076,540 to Murphy.

In all of these previous disclosures, the stop valve has a control sleeve made from low friction resilient thermoplastic material such as a Santoprene™ material manufactured by Monsanto. The handle is formed from a durable plastic material such as ABS. The operation of the valve from the open to the closed position is a simple quarter turn of the handle. The resilient plastic material of the valve control sleeve provides for a complete shut off of the water supply.

As with all stop valves, these plastic stop valves may be left in the open position for many months and even years without being touched. The interim between sequential uses of the stop is increasing because of the increased usage of washerless faucets, ceramic plate faucets and other faucets with lifetime guarantees against needed repairs. As a result, the long period of time between use of the shut off valve allows for significant mineral deposit on the valve which may bind the valve to the valve body. The resulting binding necessitates the use of increased torque to be applied onto the valve to break the binding layer of mineral deposits in order to move the valve to the closed or shut off position.

What is needed is a plastic quarter turn stop valve that has a connection to the handle that can undergo significant torque forces to overcome the binding effect of mineral deposits in the water line while still allowing for a one piece control sleeve made from a resilient plastic material.

SUMMARY OF THE DISCLOSURE

In accordance with one aspect of the invention, a plumbing valve includes a valve body having an inlet bore and an outlet bore. A resilient control sleeve is located within the valve body for rotation therein between an open and closed position. The sleeve is open at its axial inlet end and has a closing end wall. A side wall of circular cross-section extends between the open inlet end and the end wall. The side wall has at least one outlet port in fluid communication with the inlet end. The control sleeve side wall has a first portion contoured and dimensioned to be snugly but rotatably received within a sleeve receiving bore of the valve body for opening and closing the valve.

The closed end wall of the control sleeve has a handle engaging stem section axially extending therefrom. The handle engaging stem section includes an annular cylindrical shaped section defining a central axial cavity and having longitudinally extending internal facing splines that cooperate with complementary external facing splines on the handle.

Desirably, the handle has a first outer annular section with internal facing splines that engage with the external splines of the stem section. The handle has a second inner axially extending post with external facing longitudinal splines that engage complementary internal facing splines of the stem section.

Preferably, the post extends axially beyond the first annular section. The end wall of the control sleeve has a first axially positioned section extending from the side wall to the stem and a second axially displaced central section. The central cavity axially extends to the axially displaced central section such that it intrudes into a plane of the first axially positioned section of the end wall.

The handle is secured to the valve body by formations which resiliently snap into a circumferential ring on the valve body at a point radially outside of the first annular section.

According to a broader aspect of the invention, the handle engaging stem section has an outer wall with a rotationally asymmetric shape and having a centrally axial cavity therein with an inner wall having a rotationally asymmetric shape. The handle has a first stem engaging annular section with an inner wall complementarily shaped to engage the outer wall of the stem. The handle has an inner axially extending post having an outer wall with a complementary asymmetric shape to be received within the axial cavity in the stem section and to engage the inner wall of the stem section.

In this fashion, the stem section of the control sleeve is able to transfer greater torque forces than the known prior art valve stems to the control sleeve upon operation of the handle while using the same desirable resilient materials in the control valve element.

BRIEF DESCRIPTION OF THE DRAWINGS

Reference now is made to the accompanying drawings in which:

FIG. 1 is a cross-section view of the stop valve assembly of the present invention shown in the open position;

FIG. 2 is an exploded perspective view of the handle and control sleeve shown in FIG. 1;

FIG. 3 is end view of the control sleeve viewed from the stem section end;

FIG. 4 is an inner end view of the handle member; and

FIG. 5 is a cross sectional view taken along lines 5—5 shown in FIG. 1.

DETAILED DESCRIPTION OF THE PREFERRED EMBODIMENT

Referring now to FIG. 1, an angle stop valve 10 is illustrated wherein a one-quarter turn of the handle is sufficient to change the condition of the valve from fully open as shown to fully closed. The valve has a valve body 11 that receives a resilient control sleeve 12. The sleeve 12 is selectively rotated by a handle 14 between the closed position and the open position (as shown).

The valve body 11 includes inlet bore 16 adapted to be connected to a water supply line, outlet bore 18 adapted to be connected to an outlet line and neck 20 which rotatably supports and interconnects with handle 14 in a manner to be described below.

Resilient control sleeve 12 is rotatably mounted with valve body inlet bore 16 and is inserted from the opening thereof, that is from the left toward the right as viewed in FIG. 1. The cylindrically shaped side wall 21 of the control sleeve 12 is provided with an outlet port 24 which may be selectively brought into registry with valve body outlet bore 18 to establish a fluid flow path from inlet bore 16, through sleeve bore 22, and port 24 and finally out through outlet bore 18.

As clearly shown in FIG. 2, the interior of side wall 21 may have longitudinally extending reinforcing ribs 23 and 25. The axial position of rib 23 is positioned to lie directly across the diameter of the valve body outlet bore 18 when the control sleeve is in its closed position. The rib locally increases the stiffness of the control sleeve side wall 21 and prevents it from bulging radially outwardly into outlet bore 18 under high fluid pressure conditions when the valve is in its closed position. Such bulging would be undesirable because it would tend to produce wear on the exterior surface of the control sleeve as such surface rubbed against the opposed edges of the outlet bore opening when the control sleeve was moved from the closed position toward the open position. Secondly, the increased friction increases the amount of torque exerted on the stem section 28 by handle in order to turn the control sleeve.

The rib 25 is at the trailing edge of port 24 as the valve is turned to the closed position. In this position, rib 25 provides additional rigidity as the pressure within the sleeve builds up, during valve closing, to prevent the sleeve from ballooning or bulging outwardly into the outlet port from about the port 24.

Referring now to FIGS. 1 and 3, the sleeve bore 22 extends to an end wall 26 that connects the side wall 21 with the axially extending stem section 28. The stem section 28 is annular in shape with an annular outer wall 30 having longitudinal splines 32 and an inner wall 34 with longitudinally extending grooves 36 with interposing splines 37. The inner wall 34 defines a centrally located axially extending cavity 38 which receives a central post 40 of handle 14.

Referring now to FIGS. 4 and 5, the central post 40 has complementary longitudinal splines 42 which interengage with grooves 36 and splines 37 to form a non-rotatable engagement between the handle and sleeve.

The handle also includes an annular mid-section 44 with complementary internal splines 46 which interengage with splines 32 on outer wall 30 to complete the non-rotatable connection between the handle and the stem.

The cavity 38 extends axially beyond the plane 48 of end wall 26 to a recessed central wall 50. The splines 46 and 32 extend to the end wall section 50 such that they also extend beyond the end wall plane 48.

When assembled in the pipe line and water pressure exists in the pipe line, the water pressure keeps the control sleeve axially in place with end wall 26 abutting thrust collar 52 of valve body 10. The thrust collar surrounds the stem receiving aperture 54.

The handle 14 is axially and rotatably secured to the valve body 10 by a plurality of retaining bosses 56 which can be snap fitted over neck 58 and engage within neck groove 60.

Collar 52 of the valve body serves several functions. First, it establishes the proper axial position of the control sleeve relative to the outlet bore 18 by its abutting engagement with the end wall of the control sleeve. This engagement assures the proper axial registry of the port 24 with outlet bore 18. Secondly, collar 52 also provides a safety feature in that fluid pressure cannot blow or force control sleeve 12 out to the right through valve body neck 58 in the event that the interlock between the handle 14 and the neck groove 60 has been destroyed or the handle has otherwise been removed from the valve body.

The valve body is preferably formed of extruded brass which is subsequently machined. The control sleeve is formed of a low friction resilient thermoplastic material, preferably Santoprene™ 103–40, manufactured by Monsanto. The handle can be formed of a durable plastic material such as ABS having a proper degree of resilience to permit its assembly to the valve body in the manner described above.

In this fashion, the connection between the handle and the stem provides for the transfer of increased toque that overcomes any long term mineral build-up or other deposit that may adhere the control sleeve within the valve body or overcome any increased friction due to any bulging of the resilient control sleeve within outlet port 24 as described above.

The ability to significantly increase the maximum torque transfer allows this construction of a valve with the known desirable materials to be used more universally accepted, particularly in geographic areas where hard water with many minerals are the norm. Furthermore, the valve with the improved stem connection can be confidently used in lines where the interim between using the shut off valve may be many years which may allow for a substantial build up of deposits that may otherwise bind the valve in the open position.

Variations and modifications are possible without departing from the scope and spirit of the present invention as defined by the appended claims.

The embodiments in which an exclusive property or privilege is claimed are defined as follows:

1. A plumbing valve characterized by:

a valve body having an inlet bore and an outlet bore;

a resilient control sleeve located within said valve body for rotation therein, said sleeve being open at one axial inlet end, having a closing end wall and having a side wall of circular cross-section between said ends, said side wall having at least one outlet port in fluid communication with said open axial inlet end:

said control sleeve side wall having a first portion contoured and dimensioned to be snugly but rotatably received within a sleeve receiving bore of said valve body;

said closed end wall of said control sleeve having a handle engaging stem section axially extending therefrom;

said handle engaging stem section comprising an annular cylindrical shaped section defining a central axial cavity and having longitudinally extending internal and external facing splines;

said handle having a first outer annular section with internal facing splines that engage with the external facing splines of the handle engaging stem section;

said handle having a second inner axially extending post with external facing longitudinal splines engaging the internal facing splines of said handle engaging stem section.

2. The valve as defined in claim 1 further characterized by:

said post of said handle extending axially beyond said first annular section;

said end wall of said control sleeve has a first axially positioned section extending from said side wall to said stem and a second axially displaced central section;

said central cavity axially extending to said axially displaced central section such that it intrudes into a plane of first axially positioned section of said end wall.

3. The valve as defined in claim 2 further characterized by:

said handle having an outer annular wall section that rotatably engages the valve body radially outside of said first annular section.

4. A plumbing valve characterized by:

a valve body having an inlet bore and an outlet bore;

a resilient control sleeve located within said valve body for rotation therein, said sleeve being open at one axial inlet end and closed at its axially opposite end and having a side wall of circular cross-section between said ends, said side wall having at least one outlet port in fluid communication with said inlet end;

said control sleeve side wall having a first portion contoured and dimensioned to be snugly but rotatably received with a sleeve receiving bore of said valve body;

said closed end of said control sleeve having a handle engaging stem extending therefrom;

said handle engaging stem comprising an outer wall having a rotationally asymmetric shape and having a central axial cavity therein with an inner wall having a rotationally asymmetric shape;

said handle having a first stem engaging annular section with an inner wall complementarily shaped to engage the outer wall of said stem;

said handle having an inner axially extending post having an outer wall with a complementary asymmetric shape to be received within said cavity and engage the inner wall of said stem.

5. The valve as defined in claim 4 further characterized by:

said central post of said handle extending axially beyond said first stem engaging annular section;

said control sleeve having a radially extending end wall with a first axially positioned section extending from said side wall to said stem and a second axially displaced central section;

said cavity axially extending to said axially displaced central section such that it intrudes into a plane of said first axially positioned section of said end wall.

6. The valve as defined in claim 5 further characterized by:

said handle having an outer annular wall section that rotatably engages the valve body radially outside of said first stem engaging section.

* * * * *